July 24, 1962 G. L. CLAPPER 3,046,484
CAPACITOR STORAGE UNIT
Filed Oct. 18, 1956

*INVENTOR.*
GENUNG L. CLAPPER

*BY* Paul M Enlow

AGENT

United States Patent Office 3,046,484

Patented July 24, 1962

3,046,484
CAPACITOR STORAGE UNIT

Genung L. Clapper, Vestal, N.Y., assignor to International Business Machines Corporation, New York, N.Y., a corporation of New York Filed Oct. 18, 1956, Ser. No. 616,766
7 Claims. (Cl. 328—121)

This invention relates to electronic circuits for storing information and more particularly, to a capacitive storage system for storing information as an electrical charge.

It is well known in the prior art to store a bit of information as an electrical charge on capacitive elements. For example, the presence of a binary 1 bit may be stored as the absence of a charge on a storage capacitor, and the presence of a binary 0 bit may be stored as a predetermined charge thereon, or vice versa.

Furthermore, the prior art includes capacitive storage systems wherein the information being stored is sensed during a read-out interval by attempting to alter the charge upon the storage capacitor. If the attempted alteration of the charge produces an output pulse during the read-out interval, the capacitor is said, for example, to be storing a binary 1 bit. On the other hand, the capacitor is said to be storing a binary 0, for example, if the attempted alteration fails to produce an output pulse, or vice versa.

The above-described type of capacitive storage system requires that the storage capacitor be regenerated during the time interval following the read-out interval, since the read-out operation destroys the charge stored upon the capacitor. The regeneration of the storage capacitor is generally accomplished by delaying the output pulse one time interval and thereafter reading the information sensed back into the capacitor by applying thereto a representation of the original output pulse. That is, whenever information is read out, it must be read back into the capacitor if it is to be retained in storage.

Accordingly, it is an object of the present invention to provide circuitry which regenerates the charge on the storage capacitor during the read-out interval, thereby eliminating the requirement for additional delay circuitry normally required to regenerate the capacitor during the interval following the read-out interval.

It is a further object to provide an improved capacitive storage circuit which does not destroy the charge on the storage capacitor during the read-out interval when the information stored therein is sensed or read out.

Another object is to provide a capacitive storage circuit wherein the electrical condition of the storage capacitor is automatically regenerated during each read-out interval.

An additional object is to provide a novel circuit for sensing the charge stored on a storage capacitor without altering the charge stored therein.

It is also an object to provide an improved capacitor storage system having a non-destructive read-out circuit.

A further object is to provide a novel non-destructive capacitive storage circuit having separate read-in and read-out time intervals.

A still further object is to provide a novel storage circuit having an output latch comprising a regenerative grounded grid amplifier for producing a sustained output pulse.

Another object is to provide a novel storage circuit wherein it is required that information be read into a storage capacitor only when it is desired to modify the information stored therein.

Another object is to provide a novel capacitive storage circuit for use as the storage positions of a multi-digit register of a digital computer.

A still further object is to provide a novel storage circuit having input and output terminals, a storage capacitor and a regenerative output circuit for isolating the capacitor from loads connected to the output terminal.

Other objects of the invention will be pointed out in the following description and claims and illustrated in the accompanying drawings, which disclose, by way of example, the principle of the invention and the best mode which has been contemplated of applying that principle.

In the drawing:

FIG. 1 illustrates the circuit diagram of the novel capacitive storage circuit; and FIGS. 2A–2D show idealized representations of voltage waveforms appearing at designated points in FIG. 1.

*General Description*

In order to clarify the more detailed description of the invention which follows, the principal components and functions of the invention will be discussed with respect to FIG. 1. Briefly, the purpose of the circuit of FIG. 1 is to store a bit of information as an electrical charge upon a capacitor and to provide means for reading in new information and reading out information stored in the circuit without destroying the charge on the storage capacitor. The read-in and read-out operations are respectively controlled by the gating tubes 30 and 32.

New information is read into the circuit by applying a positive pulse to input terminal 10 to read in a binary 1, whereas the absence of a pulse on terminal 10 causes a binary 0 to be read in during a read-in time interval. Storage capacitor 22 is charged to 45 volts when a binary 0 is stored therein and is charged to 0 volts when a binary 1 is being stored.

The information stored in storage capacitor 22 is read out by virtue of the read-out gating signal applied to the storage capacitor through cathode follower 32 and diode rectifier 28. If the storage capacitor is storing a binary 1, the read-out gating signal is applied through the storage capacitor causing lead 20 to be raised to approximately +10 volts. However, if the capacitor is storing a binary 0, the read-out gating signal does not affect the capacitor and therefore lead 20 remains at approximately −35 volts.

Tubes 52 and 54 comprise a regeneration latch which includes a non-inverting grounded grid amplifier. During a read-out interval, the regeneration latch is turned On (i.e., is operative to produce an output signal) when capacitor 22 is storing a binary 1, but remains Off or inoperative if the capacitor is storing a binary 0. The regeneration latch is always turned Off at the end of each digit interval through the action of the digit clamp tube 78.

The output of the regeneration latch appearing at the plate of tube 52 is coupled through cathode follower 88 to output terminal 92. Accordingly, if the regeneration latch is turned On during a read-out interval (indicating the storage of a binary 1) a positive pulse appears on output terminal 92 whereas this terminal is negative when the regeneration latch is Off (binary 0 stored).

*Detailed Description of the Storage Circuit*

Figure 1:
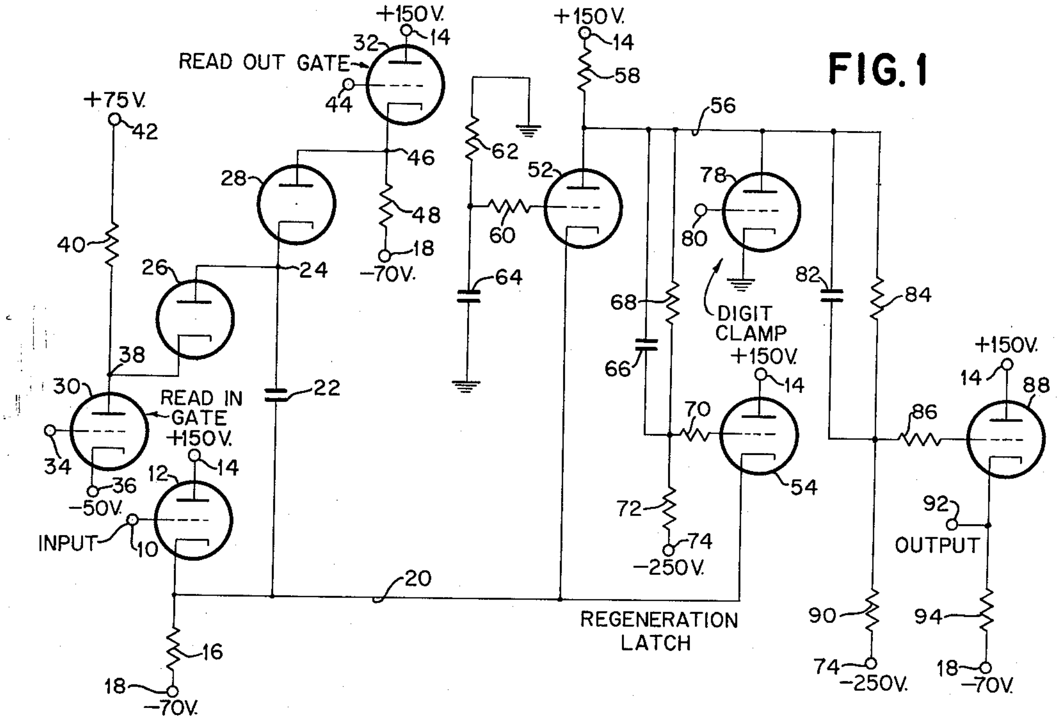
Figure 2:
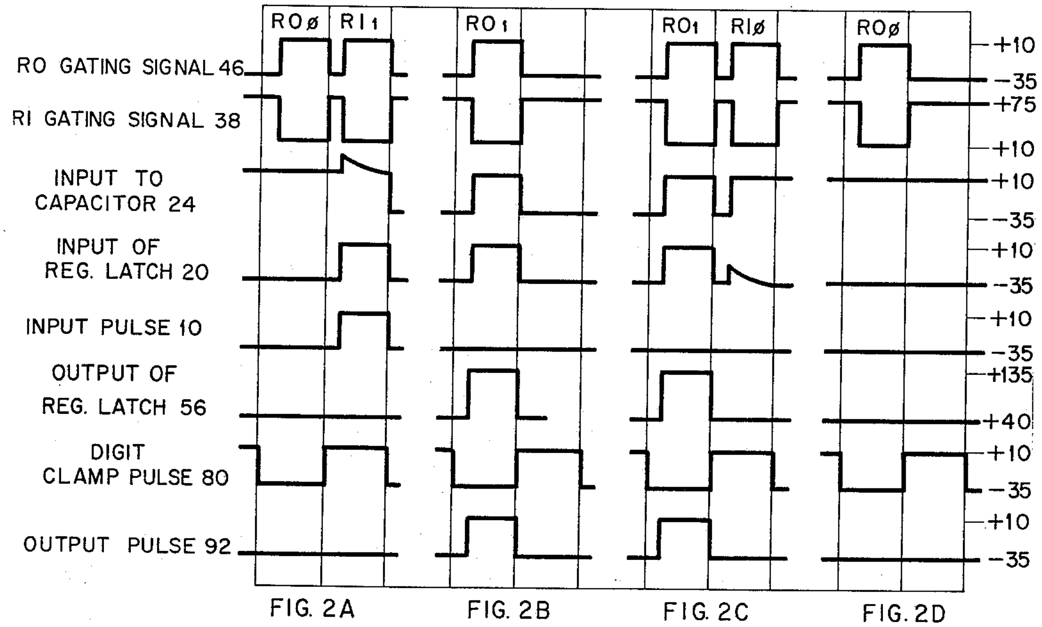

In the following description the idealized waveform that appears at a particular point in the circuit of FIG. 1 is identified in FIG. 2 by the reference character associated with the circuit point of FIG. 1. In FIG. 2, it is noted that a read-out interval may be followed by a read-in interval and that during a read-out interval the information stored in the storage capacitor is always read out and represented at output termianl 92.

Input terminal 10 of the capacitive storage circuit of FIG. 1 is connected to the control grid of input cathode follower 12. The plate of cathode follower 12 is connected to the +150 volt terminal 14 and the cathode thereof is connected through cathode load resistor to the —70 volt terminal 18. In order to read in a binary 1 bit during a read-in interval, the input signal applied to terminal 10 must be approximately +10 volts, whereas this signal is approximately —35 volts in order to read in a binary 0.

The cathode of cathode follower 12 is also connected to lead 20 and to the lower plate of storage capacitor 22. The upper plate of capacitor 22 is connected to juncture 24, which in turn, is connected to the plate of diode rectifier 26 and the cathode of diode 28. The diodes 26 and 28 serve to clamp juncture 24 at potential levels of junctures 38 and 46. Triode 30 serves as the RI gate tube and has its control grid connected to terminal 34 which receives the inverse of the read-in gating signal illustrated in FIGS. 2A–2D. This may be the same gating signal that is applied to the control grid of the RO gate tube 32 suitably lowered in voltage level by means of an input voltage divider. The cathode of triode 30 is connected to the —50 volt terminal 36 and the plate is connected to juncture 38. Juncture 38 is connected to the cathode of diode 26 and through the plate load resistor 40 to the +75 volt terminal 42.

The control grid of the RO gate tube 32 is connected to terminal 44 which receives the read-out gating signal. As depicted in FIGS. 2A–2D, the RO gate signal appears on the cathode of tube 32 which is connected to juncture 46 and through resistor 48 to the —70 volt terminal 18. Juncture 46 is also connected to the plate of diode 28. The plate of tube 32 is connected to the +150 volt terminal 14.

Triode 52 is operated as a non-inverting grounded grid amplifier stage and in conjunction with cathode follower 54, comprise the regeneration latch. The cathode follower 54 serves as a non-inverting feedback circuit which feeds back the signal at the anode of tube 52 to the cathode thereof. During a read-out interval, the regeneration latch is turned On if storage capacitor 22 is storing a binary 1 bit, but remains Off if the storage capacitor is storing a binary 0 bit.

The cathodes of triodes 52 and 54 are connected together and to juncture 20. The plate of triode 52 is connected to juncture 56 and through plate load resistor 58 to the +150 volt terminal 14. The control grid of triode 52 is connected through the parasitic suppressing resistor 60 to the juncture of resistor 62 and capacitor 64. Resistor 62 and capacitor 64 are connected in parallel between ground and one side of resistor 60.

The plate of triode 52 and juncture 56 are connected through the parallel combination of capacitor 66 and resistor 68 which is in series with parasitic suppressing resistor 70 to the control grid of cathode follower 54. The juncture between the parallel combination of capacitor 66 and resistor 68 and resistor 70 is connected through resistor 72 to the —250 volt terminal 74. The plate of cathode follower 54 is connected to the +150 volt terminal 14.

Briefly, when the regeneration latch comprising tubes 52 and 54 is Off, triode 52 is normally conductive due to the fact that juncture 20 is at approximately —35 volts. Accordingly, the plate of triode 54 is held down to approximately +40 volts due to the conduction of current by this tube. The resistors 68 and 72 form a voltage dividing network which directly couples the plate of triode 52 to the grid of cathode follower 54. When juncture 56 is at approximately +40 volts, the cathode follower 54 will be conducting a minimum current. The regeneration latch is turned On when juncture 20 is raised to approximately +10 volts. The positive direction signal applied to the cathode of the grounded grid amplifier 52 renders the tube non-conductive so that the plate thereof and juncture 56 rise to approximately +135 volts. The increased potential at juncture 56 renders cathode follower 54 highly conductive thereby causing the cathode thereof to be maintained at approximately +10 volts. The potential at the cathode of tube 54 is in turn applied to the cathode of the grounded grid amplifier 52 affording a regenerative action which maintains tube 52 cut Off and tube 54 highly conductive. During the occurrence of this regenerative action, the regenerative latch is said to be On.

Triode 78 is referred to as a digit clamp tube and serves to turn the regenerative latch Off at the end of each read-out interval. During a read-in interval, tube 78 prevents the latch from being turned On. The cathode of tube 78 is connected to ground, the plate is connected to juncture 56, and the control grid thereof is connected to terminal 80. Terminal 80 receives the digit clamp signal illustrated in FIGS. 2A–2D. At the end of each read-out interval, the control grid of triode 78 is raised to approximately +10 volts which renders triode 78 conductive. Tube 78 then draws current through resistor 58 thereby causing juncture 56 to drop from +135 volts to approximately +40 volts. The decrease in potential on juncture 56 causes cathode follower 54 to conduct less current so that juncture 20 falls to approximately —35 volts. The decrease in potential at juncture 20 renders triode 52 conductive once again.

Juncture 56 is connected through the parallel combination of capacitor 82 and resistor 84, in series with the parasitic suppressing resistor 86, to the control grid of output cathode follower 88. The intermediate connection between the parallel combination of units 82 and 84 and resistor 86 is connected through resistor 90 to the —250 volt terminal 74. The plate of cathode follower 88 is connected to the +150 volt terminal 14, and the cathode thereof is connected to output terminal 92 and also through cathode load resistor 94 to the —70 volt terminal 18.

Juncture 56 is direct-coupled through the voltage dividing network formed by resistors 84 and 90 to the control grid of output cathode follower 88. Therefore, when juncture 56 is at its most positive voltage excursion, the cathode follower is rendered highly conductive so that output terminal 92 is raised to approximately +10 volts. However, when juncture 56 is at its least positive excursion (regeneration latch is Off), cathode follower 88 is rendered less conductive so that output terminal 92 is at approximately —35 volts. Reference to the output voltage waveform 92 of FIGS. 2A–2D indicates that the output terminal is at approximately +10 volts during a read-out interval only when the capacitive storage circuit of FIG. 1 is currently storing a binary 1. At all other times, including the situation when the circuit of FIG. 1 is storing a binary 0, the output terminal 92 exhibits a potential of —35 volts.

*Read-Out Operation*

A read-out operation may take place during any time interval, but generally takes place immediately preceding a read-in interval. With respect to FIGS. 2A–2D, FIG. 2A illustrates the waveforms occurring when a binary 0 is read out during a read-out interval and a binary 1 is read in in the following read-in interval. FIG. 2B illustrates the read out of a binary 1 followed by an interval during which neither read-in nor read-out takes place; FIG. 2C illustrates the read out of a binary 1 followed by the read in of a binary 0; and FIG. 2D illustrates the read-out of a binary 0 followed by an interval during which neither operation is performed.

Consider first, for example, the situation existing during a read-out interval when the circuit of FIG. 1 is storing a binary 1. As stated previously, when the capacitive storage circuit of FIG. 1 is storing a binary 1, capacitor 22 is substantially uncharged so that junctures 24 and 20 are initially at approximately —35 volts. The application of a positive pulse to terminal 44 causes juncture 46 to be raised to approximately +10 volts, as illustrated in FIG. 2B. Simultaneously, a positive pulse is applied to terminal 34 causing read-in gate tube 30 to be rendered conductive so that the potential at juncture 38 drops to approximately +10 volts. Accordingly, diodes 26 and 28 cause juncture 24 to be raised to approximately +10 volts. The voltage pulse appearing at juncture 24 is coupled through capacitor 22 to juncture 20 so that juncture 20 is also raised to approximately +10 volts. As stated earlier, juncture 20 constitutes the input to the regeneration latch which includes triodes 52 and 54.

The increase in potential at juncture 20 (FIG. 2B) is applied to the cathode of the grounded grid amplifier tube 52 thereby causing this tube to be cut off. The cessation of current flow through triode 52 permits juncture 56 to rise to approximately +135 volts. The positive direction signal appearing at juncture 56 is coupled to cathode follower 54 causing the latter to become highly conductive. The increased current flow through cathode follower 54 causes the cathode thereof to exist at approximately 10 volts and this signal is in turn, applied to the cathode of the grounded grid amplifier tube 52. Hence, a regenerative action exists which causes juncture 20 to remain at +10 volts, causes tube 52 to remain cut off, and causes cathode follower 54 to remain highly conductive.

Thus it is apparent that the regeneration latch is turned On during a read-out interval whenever the storage capacitor 22 is storing no charge so as to represent the storage of a binary 1 bit. The regeneration latch will remain operative until the digit clamp tube 78 of FIG. 1 is rendered operative.

The digit clamp pulse applied to terminal 80 is illustrated in FIG. 2B and must be at approximately −35 volts throughout a read-out interval and rises to approximately +10 volts at the termination of the read-out interval. When terminal 80 receives the positive direction digit clamp pulse, triode 78 is rendered conductive thereby causing the potential at juncture 56 to decrease to approximately +40 volts. The negative direction signal at juncture 56 renders cathode follower 54 less conductive so that the potential at juncture 20 is permitted to decrease to approximately −35 volts. The regeneration latch is then turned Off and remains Off until such later time as a binary 1 is read out from storage capacitor 22.

During the read-out interval described above, when juncture 56 is at approximately +135 volts, the control grid of output cathode follower 88 is positive so that the cathode follower is highly conductive. The heavy current being conducted through cathode follower 88 causes terminal 92 to be at approximately +10 volts. Terminal 92 remains at this potential level until the action of the digit clamp tube 78 turns Off the regeneration latch. When the regeneration latch is turned Off, cathode follower 88 becomes less conductive and the potential at output terminal 92 drops to approximately −35 volts. Accordingly, a positive pulse appears at terminal 92 as illustrated in FIG. 2B whenever a binary 1 is read out from the capacitive storage circuit of FIG. 1.

It should be noted that at the termination of the read-out interval, junctures 24 and 20 of FIG. 1 each return to approximately −35 volts. Therefore, since capacitor 22 is still storing a charge of approximately 0 volts, the circuit of FIG. 1 is storing a binary 1 bit after the completion of the read-out interval. Stated another way, the read-out of the information stored in storage capacitor 22 does not destroy the information stored therein, and the circuit of FIG. 1 is characterized as having a non-destructive read out.

Consider now the operation of the circuit of FIG. 1 during a read-out interval when the circuit is storing a binary 0. As noted hereinbefore, when the circuit is storing a binary 0, storage capacitor 22 is charged to approximately 45 volts.

When storage capacitor 22 is storing a binary 0, the potential at juncture 20 is approximately −35 volts and the potential at juncture 24 is approximately +10 volts. The read-out gating signal applied to terminal 44 and the read-in gating signal appearing at juncture 38 are each changed to the +10 volt level as illustrated in the first time interval of FIGS. 2A and 2D. The fact that junctures 38 and 46 are at approximately +10 volts, causes diodes 26 and 28 to maintain juncture 24 at the +10 volt level.

When the read-out gating signal rises to the +10 volt level, the potential at juncture 24 is not altered since it already exists at approximately +10 volts. Therefore, there is no voltage change to be coupled through capacitor 22 to juncture 20 and thus juncture 20 remains at approximately −35 volts.

From the discussion hereinbefore, it is clear that the regeneration latch is not operated during the read-out of a binary 0 since juncture 20 continues to remain at the −35 volt level. Accordingly, the grounded grid amplifier tube 52 remains conductive and juncture 56 remains at approximately +40 volts. The potential at juncture 56 therefore causes cathode follower 88 to remain less conductive so that output terminal 92, in turn, remains at the −35 volt level. As illustrated during the first interval of FIG. 2A, the read-out of a binary 0 is represented at terminal 92 as the absence of a positive pulse.

Here again, it is to be noted that at the termination of the read-out interval storage capacitor 22 is storing the same charge that it was prior to the read-out interval. In the example above, where capacitor 22 was storing a binary 0 as represented by a charge of 45 volts, the capacitor continues to store this charge at the termination of the read-out interval as indicated by the fact that juncture 24 remains at the +10 volt level and juncture 20 remains at the −35 volt level.

*Read-In Operation*

In order to read in a binary 1 during a read-in interval, terminal 10 is raised to the +10 volt level as illustrated in the second time interval of FIG. 2A. However, when a binary 0 is to be read into the circuit of FIG. 1, terminal 10 remains at the −35 volt level. In other words, a binary 1 bit is read into the circuit of FIG. 1 by applying a positive pulse to terminal 10.

During a read-in interval, the read-in gating signal and the read-out gating signal appearing at junctures 38 and 46 are applied to diodes 26 and 28 so as to cause juncture 24 to be raised to at least the +10 volt level as illustrated in the second time interval of FIGS. 2A and 2C.

When a binary 1 is read into the circuit of FIG. 1, the signal applied to terminal 10 (see FIG. 2A) renders input cathode follower 12 highly conductive so that juncture 20 is raised to approximately +10 volts as indicated in FIG. 2A. Accordingly, since junctures 24 and 20 are each at approximately +10 volts, capacitor 22 is charged to approximately 0 volts. At the termination of the read-in interval illustrated in FIG. 2A, junctures 24 and 20 each recede to the −35 volt level so that storage capacitor 22 continues to store a charge of approximately 0 volts.

As explained above, during every read-in interval, juncture 24 is maintained at approximately +10 volts by the read-in and read-out gating signals appearing at junctures 38 and 46. The voltage waveforms existing in the circuit of FIG. 1 during the read in of a binary 0 are illustrated during the second time interval of FIG. 2C.

Input terminal 10 remains at approximately −35 volts throughout the read-in interval during which a binary 0 is being read into the circuit of FIG. 1. Accordingly, input cathode follower 12 is rendered less conductive so that juncture 20 exhibits a potential of approximately −35 volts. Since juncture 24 is existing at the +10 volt level and juncture 20 is existing at the −35 volt level, storage capacitor 22 is charged to approximately 45 volts thereby indicating the storage of a binary 0. FIG. 2C further indicates that at the termination of the read-in interval the potential levels of junctures 24 and 20 are such that capacitor 22 remains charged to approximately 45 volts.

It is to be noted that during a read-in interval, the regeneration latch is not operated when the potential of juncture 20 is raised to +10 volts. The reason that the regeneration latch is not operated is that the digit clamp pulse applied to terminal 80 during a read-in interval renders tube 78 conductive throughout the interval period. The current flow through triode 78 during the read-in interval causes juncture 56 to remain at the +40 volt level. Therefore, even though a positive signal appears on juncture 20, which renders the grounded grid amplifier tube 52 non-conductive, digit clamp triode 78 maintains juncture 56 at its least positive extremity. Hence, the regeneration action normally aided by cathode follower 54 cannot take place. Since juncture 56 remains at the +40 volt level throughout each read-in interval, cathode follower 88 remains less conductive so that output terminal 92 exhibits a potential of −35 volts.

The waveforms of FIG. 2A illustrate the change in the charge stored by capacitor 22 when the read out of a binary 0 is followed by the read in of a binary 1 and the waveforms of FIG. 2C illustrate the change in the charge on the capacitor when the read out of a binary 1 is followed by the read in of a binary 0. FIGS. 2B and 2D fairly indicate that the charge on the storage capacitor is unchanged following a read-out interval during which either a binary 1 or a binary 0 is read out.

The description hereinabove illustrates that the circuit of FIG. 1 permits the regeneration of the storage capacitor during the read-out interval without requiring the use of external delay circuitry. The circuit further illustrates a novel circuit having a non-destructive read out. The potential values stated in the foregoing description are considered as merely representative and may be changed without altering the scope of the invention.

The novel circuit of FIG. 1 finds utility, for example, in digital computers as a storage element. For example, a plurality of capacitive storage circuits, each similar to the circuit of FIG. 1, may be combined with appropriate input and output switching means to form a register for storing digital information. A plurality of devices as illustrated in FIG. 1 may also be utilized as a memory in a digital computer.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A capacitive storage circuit for storing binary information as an electrical charge during a read-in interval and having a non-destructive read-out circuit operable during a read-out interval comprising in combination, a storage capacitor having first and second terminals, first electronic discharge means coupled to said first terminal for applying a first potential thereto to store a binary 1 and to apply a second potential thereto to store a binary 0, second electronic discharge means coupled to said second terminal for applying a first potential thereto during read-in and read-out intervals whereby a positive direction signal is manifested at said first terminal during a read-out interval in the absence of a charge on said capacitor, a grounded grid amplifier tube having the cathode thereof coupled to said first terminal whereby said tube is rendered non-conductive in response to said positive direction signal so as to produce a second positive direction signal at the plate of said amplifier, cathode follower means having the input thereof coupled to the plate of said grounded grid amplifier tube and having the cathode thereof coupled to said first terminal whereby said second positive direction signal renders said cathode follower means operative to maintain said first terminal at said first potential throughout a read-out interval, and means for applying a negative direction voltage pulse to the plate of said grounded grid amplifier tube at the termination of the read-out interval to thereby render said amplifier tube conductive to apply a second potential to said first terminal so that the capacitor retains its condition of no charge at the termination of the read-out interval.

2. A capacitive storage circuit for storing binary information as an electrical charge during a read-in interval and having a non-destructive read-out circuit operable during a read-out interval comprising in combination, a storage capacitor having first and second terminals, first electronic discharge means coupled to said first terminal for applying a first potential thereto to store a binary 1 and to apply a second potential thereto to store a binary 0, second electronic discharge means coupled to said second terminal for applying a first potential thereto during read-in and read-out intervals whereby a positive direction signal is manifested at said first terminal during a read-out interval in the absence of a charge on said capacitor, regenerative circuit means responsive to said positive direction signal to raise said first terminal to said first potential so that said capacitor remains uncharged, and means coupled to said regenerative circuit means for rendering the latter non-regenerative at the termination of the read-out interval so that said regenerative circuit means lowers said first terminal to said second potential whereby said capacitor is storing a charge of zero volts at the termination of said read-out interval.

3. An electronic storage circuit for storing binary bits of information and having a non-destructive read-out circuit including the combination of: a storage capacitor having first and second terminals; diode gating means coupled to said first terminal for maintaining the potential of said first terminal at a first voltage level during read-in and read-out intervals and for permitting said first terminal to float freely during intervals other than read-in and read-out intervals; means coupled to said second terminal for causing the potential of said second terminal to exist at said first or a second voltage level during a read-in interval whereby said storage capacitor remains uncharged or is charged to a predetermined level respectively; a regenerative circuit means coupled to said second terminal for causing said second terminal to exist at said first voltage level during a read-out interval when said capacitor is uncharged and for causing said second terminal to exist at said second voltage level when said capacitor is storing a predetermined electrical charge, said regenerative circuit being rendered regenerative when the potential of said second terminal assumes said first voltage level as the result of the operation of said gating circuit; means for rendering said regenerative circuit means non-regenerative during a read-in interval; an output terminal; and cathode follower means coupling said regenerative circuit means to said output terminal whereby a positive pulse appears at said output terminal during a read-out interval when said storage capacitor is uncharged.

4. A capacitive storage circuit for storing binary information as an electrical charge during a read-in interval and having a non-destructive read-out circuit operable during a read-out interval and including the combination of, a capacitor having first and second terminals, a resistor connected in series with said capacitor, switching means for connecting said second terminal to a source of positive potential during a read-out interval to thereby generate a positive direction signal across said resistor only when said capacitor is initially in an uncharged electrical condition, regenerative circuit means responsive to said positive direction signal to maintain the juncture between said capacitor and said resistor at a positive potential level whereby said capacitor remains uncharged throughout the read-out interval, and means coupled to said regenerative circuit means for disabling the latter at the termination of the read-out interval to thereby return said juncture to a negative potential level whereby the information stored in said capacitor is read out during a read-out interval without altering the initial electrical condition of said capacitor.

5. A sensing circuit for sensing information stored in a capacitive storage circuit without destroying the information stored therein comprising the combination of, a storage capacitor having first and second terminals, means for applying a first or second potential to said first terminal whereby the charge on said capacitor is indicative of the presence or absence of stored information, means for applying a voltage pulse to said capacitor to cause a voltage signal to appear at said first terminal only if said capacitor is storing no charge, an electron discharge tube having grid plate and cathode elements, said cathode being connected to said first terminal, means coupling said grid to ground potential whereby said tube is operated as a grounded grid amplifier, a cathode follower controlled by said tube for providing an output voltage as determined by the conductive state of said tube and for applying a feedback voltage to the grid of said tube and to said first plate of said capacitor whereby said voltage signal renders said tube non-conductive to establish a regenerative condition with respect to said tube and said cathode follower, and means coupled to the plate of said tube for destroying said regenerative condition, whereby said regenerative condition is established only when said capacitor is uncharged during the operation of the sensing circuit.

6. An electronic storage circuit comprising the combination of, a storage capacitor for representing binary information as the presence or absence of an electrical charge, a source of potential connected in series with said capacitor, means for applying a read-out voltage signal to said capacitor to cause a voltage pulse to appear at the juncture of said potential source and said capacitor in the absence of a charge stored in said capacitor, an electronic latching circuit connected to said juncture and adapted to alternately assume a regenerative and a non-regenerative condition in response to predetermined voltages applied thereto and including means for maintaining said juncture at a first voltage level in response to said electrical signal at said juncture, and means coupled to said latching circuit for rendering said circuit non-regenerative at the termination of a read-out operation.

7. A capacitive storage circuit for storing binary information as an electrical charge during a read-in interval and having a non-destructive read-out circuit operable during a read-out interval comprising the combination of, a storage capacitor having first and second terminals for storing information as the presence or absence of an electrical charge, an electron discharge device for conducting current, a load impedance connected in series with said electron discharge device, a conductive connection between said first terminal and the juncture of said discharge device and said load impedance, a read-out circuit including a plurality of rectifiers connected to said second terminal for applying a predetermined voltage signal thereto to produce a positive direction voltage signal at said juncture when said capacitor is in the uncharged condition, a first electron tube having grid, plate and cathode elements and responsive to a positive direction signal to produce an output signal, means coupling the grid element of said first electron tube to ground potential thereby adapting said first tube to operate as a grounded grid amplifier, a conductive connection between said first terminal of said capacitor and said cathode, a second electron tube for regenerating the charge on said capacitor for selectively controlling the potential applied to said capacitor and adapted to operate as a cathode follower having grid and cathode elements, a resistance network for directly coupling the plate element of said first tube to the grid of said cathode follower tube, a direct conductive connection between the cathode of said cathode follower tube and the juncture of said capacitor and cathode of said first tube so that a positive voltage is applied to said capacitor when said first tube is rendered non-conductive to thereby prevent said capacitor from being charged, and a third electron tube having plate and cathode elements respectively connected to the plate of said first tube and ground and adapted to render said first tube conductive in response to plate current conduction by said third tube, whereby the read-out of said capacitor produces an output signal at the plate of said first tube and simultaneously said first tube regenerates said capacitor.

References Cited in the file of this patent

UNITED STATES PATENTS

| | | |
|---|---|---|
| 2,468,687 | Schmitt | Apr. 26, 1949 |
| 2,691,728 | Noble et al. | Oct. 12, 1954 |
| 2,725,471 | Appelton et al. | Nov. 29, 1955 |
| 2,823,369 | Haug et al. | Feb. 11, 1958 |
| 2,922,985 | Crawford | Jan. 26, 1960 |